US006024056A

United States Patent [19]

Hojyo et al.

[11] Patent Number: 6,024,056

[45] Date of Patent: Feb. 15, 2000

[54] COOLING WATER PASSAGE STRUCTURE IN WATER COOLED TYPE V-SHAPED INTERNAL COMBUSTION ENGINE

[75] Inventors: Atuo Hojyo; Makoto Harada; Fumiaki Okubo; Toshiyasu Murano, all of Saitama, Japan

[73] Assignee: Honda Giken Kogyo Kabushiki Kaisha, Tokyo, Japan

[21] Appl. No.: 08/905,950

[22] Filed: Aug. 5, 1997

[30] Foreign Application Priority Data

Aug. 5, 1996 [JP] Japan .................................... 8-206239

[51] Int. Cl.[7] ................................ F01P 3/20; F01P 11/04; F16L 21/08

[52] U.S. Cl. .................................... 123/41.79; 123/41.28; 123/41.74; 285/370; 285/397

[58] Field of Search ............................. 123/41.74, 41.79, 123/41.28, 41.81; 285/370, 397

[56] References Cited

U.S. PATENT DOCUMENTS

| | | | |
|---|---|---|---|
| 2,334,731 | 11/1943 | Szekely | 123/41.29 |
| 4,666,193 | 5/1987 | Hockett | 285/334.3 |
| 4,913,465 | 4/1990 | Abbema et al. | 285/22 |
| 5,092,633 | 3/1992 | Burkit | 285/109 |
| 5,205,593 | 4/1993 | Fondeur | 285/222 |
| 5,480,196 | 1/1996 | Adams, Jr. | 285/369 |
| 5,566,984 | 10/1996 | Abbema et al. | 285/22 |
| 5,671,954 | 9/1997 | Cheramie | 285/281 |
| 5,868,434 | 2/1999 | Brakland | 285/15 |

FOREIGN PATENT DOCUMENTS 6-3142 1/1994 Japan .

*Primary Examiner*—Noah P. Kamen
*Assistant Examiner*—Hai Huynh
*Attorney, Agent, or Firm*—Birch, Stewart, Kolasch & Birch, LLP

[57] ABSTRACT

A cooling water passage structure for connecting cooling water passages in cylinders forming a V-shape in a water cooled type V-shaped internal combustion engine. A front cooling water passage of a front cylinder communicates with a front cooling water passage of a front cylinder head. A rear cooling water passage of a rear cylinder communicates with a rear cooling water passage of a rear cylinder head. Water pipes and cylindrical portions project from opposed positions of the front and rear cylinders and extend in one straight line. A connecting pipe is formed of rubber and is inserted in the water pipes. Ring clips and are engaged with annular grooves formed on the outer circumference of the connecting pipe at the front ends of the water pipes. O-rings are engaged with the outer circumference of the connecting pipe near the opposite ends thereof. The water pipes are connected to each other in a water tight manner.

14 Claims, 10 Drawing Sheets

COOLING WATER PASSAGE STRUCTURE IN WATER COOLED TYPE V-SHAPED INTERNAL COMBUSTION ENGINE

BACKGROUND OF THE INVENTION

1. Field of the Invention

The present invention relates to a cooling water passage structure for connecting cooling water passages in cylinders forming a V-shape in a water cooled type V-shaped internal combustion engine.

2. Description of Background Art

A conventional cooling water passage structure for connecting cooling water passages in cylinders forming a V-shape in a water cooled type V-shaped internal combustion engine is described in Japanese Utility Model Publication No. 6-3142.

The cooling water passage structure described in this publication is shown in FIG. 10 wherein a V-shaped space 03 is defined between opposed cylinders 01 and 02, and cylindrical portions 04 and 05 project from the cylinders 01 and 02 into the V-shaped space 03 so as to extend in one straight line. The cylindrical portions 04 and 05 communicate with cooling water passages 06 and 07 in the cylinders 01 and 02, respectively. A connecting pipe 08 is engaged with the outer circumferential surfaces of the opposed cylindrical portions 04 and 05. O-rings 09 are interposed between the inner circumferential surface of the connecting pipe 08 and the outer circumferential surfaces of the cylindrical portions 04 and 05. Clips 010 are engaged with the outer circumferential surfaces of the cylindrical portions 04 and 05 so as to be maintained in contact with the opposite ends of the connecting pipe 08.

The connecting pipe 08 in the cooling water passage structure mentioned above is formed of rigid metal such as aluminum or steel. Accordingly, even though the O-rings 09 are interposed therebetween, it is necessary to increase a working accuracy of the outer circumferential surfaces of the cylindrical portions 04 and 05 and a working accuracy of the inner circumferential surface of the connecting pipe 08.

In many cases, bosses 011 are provided for connection with cylinder heads (not shown) or other projections for mounting auxiliaries or sensors that project from the outer circumferences of the cylinders 01 and 02. In cutting the outer circumferential surfaces of the cylindrical portions 04 and 05, the cylinders 01 and 02 are rotated about the center line of the cylindrical portions 04 and 05 in many cases. In this cutting work, there is a possibility that the bosses 011 or the projections may come into contact with a cutting tool located on the outer circumferences of the cylindrical portions 04 and 05, thus hindering a smooth cutting work of the cylindrical portions 04 and 05.

When a cylinder scissors angle defined by the cylinders 01 and 02 is small, the projection lengths of the cylindrical portions 04 and 05 are limited, and the engagement lengths of the cylindrical portions 04 and 05 with respect to the connecting pipe 08 are also reduced, causing a difficulty in maintaining water tightness.

The present invention relates to an improvement in a cooling water passage structure in a water cooled type V-shaped internal combustion engine that solves the above problems. In the cooling water passage structure in the water cooled type V-shaped internal combustion engine, the improvement provides cylindrical portions that communicate with cooling water passages in opposed cylinders forming a V-shape project substantially in one straight line into a V-shaped space defined between said opposed cylinders. The opposite end portions of a connecting pipe engaged in said cylindrical portions are water tight.

In the present invention, contact portions of each cylindrical portion with respect to the connecting pipe are formed on the inner circumferential surface of each cylindrical portion. Accordingly, the length of the inner circumferential surface of each cylindrical portion from the front end to the bottom of the cylindrical portion is constructed larger than the projection length of each cylindrical portion projecting from the outer surface of the corresponding cylinder. As a result, even though the cylinder scissors angle between the opposed cylinders is small, and the projection length of each cylindrical portion is accordingly short, a sufficient engagement length of the connecting pipe with respect to each cylindrical portion can be ensured. Thus, the present invention is applicable also to a V-shaped internal combustion engine having a small cylinder scissors angle between the cylinders.

In the present invention, a connecting portion of each cylindrical portion with respect to the connecting pipe is the inner circumferential surface of each cylindrical portion. Accordingly, even though a projection or the like is present in the vicinity of each cylindrical portion on the outer surface of each cylinder, cutting work on the inner circumferential surface of each cylindrical portion can be easily performed by inserting a cutting tool into each cylindrical portion without hindrance of the projection and rotating each cylinder about the center line of each cylindrical portion.

In the present invention, even when the pressure of cooling water flowing in the cylindrical portions and the flexibility of the connecting pipe increases, the flexible connecting pipe is expanded by the increased pressure of the cooling water to increase the pressure contact with the inner circumferential surfaces of the cylindrical portions, thereby ensuring water tightness in a cooling water system.

In the present invention, even if there are variations in the working accuracy of the inner circumferential surfaces of the opposed cylindrical portions or locating accuracy of the opposed cylinders, the variations can be absorbed by elastic deformation of the flexible connecting pipe. The flexible connecting pipe can be engaged into the cylindrical portions easily and securely.

In the present invention, the connecting pipe can be stably engaged into the cylindrical portions.

In the present invention, water tightness of an engaged portion of each cylindrical portion with respect to the connecting pipe can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
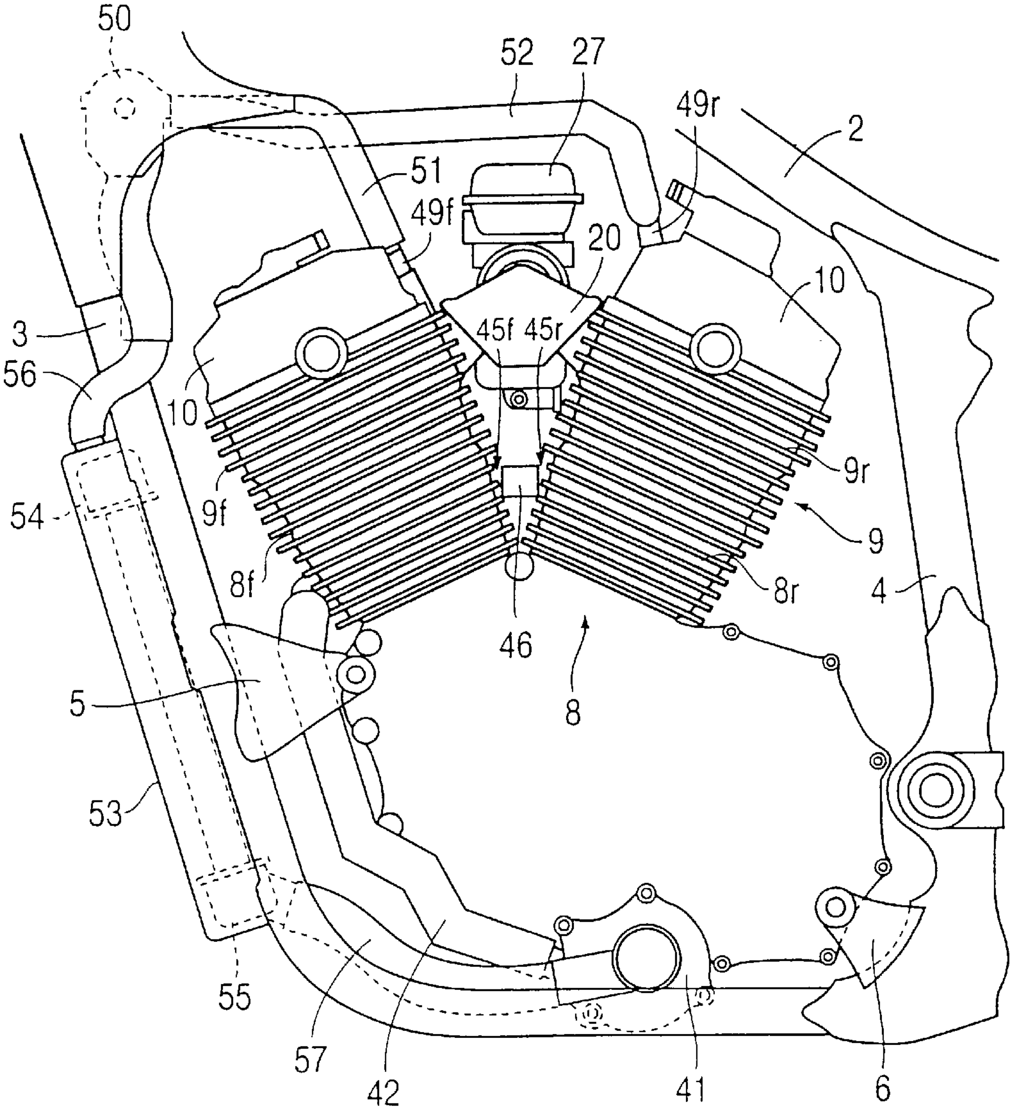
FIG. 1 is a side view of an internal combustion engine with a carburetor having an intake pipe structure according to the present invention.

A preferred embodiment of the present invention will now be described with reference to FIGS. 1 to 9. A 4-stroke, overhead valve type, longitudinally V-shaped 2-cylinder internal combustion engine 1 including an intake pipe according to the present invention is mounted through brackets 5 and 6 to a down tube 3 and a center frame 4, respectively, which depend from the front and rear portions of a main frame 2 of a motorcycle. In the overhead valve type, longitudinally V-shaped 2-cylinder internal combustion engine 1, a cylinder 8, consisting of **8*f* and 8*r*, and a cylinder head 9, consisting of 9*f* and 9*r*, are stacked in this order and connected together on a crankcase 7 with a cylinder scissors angle being set to about 52° (the crankcase 7, the cylinders 8*f* and 8*r*, and the cylinder heads 9*f* and 9*r* are formed of aluminum or aluminum alloy, and an outer circumferential portion of a cylinder hole 11 of the cylinders 8*f* and 8*r* is formed of cast iron), and an upper portion of the cylinder heads 9*f* and 9*r* is covered with a head cover 10**.

A piston 12 is vertically slidably engaged in a cylinder hole 11 formed in the cylinders **8*f* and 8*r*. The piston 12 and a crankshaft 14, which are disposed in the lateral direction of the vehicle, are connected to each other by a connecting rod 13. The crankshaft 14 is rotationally driven by vertical movement of the piston 12**.

An intake port 15 includes a laterally bifurcated downstream portion and is formed through the cylinder heads **9*f* and 9*r* on the cylinder scissors angle side of the cylinders 8*f* and 8*r*, and an exhaust port 16 is formed through the cylinder heads 9*f* and 9*r* on the side opposite to the cylinder scissors angle side. An aluminum flange 22 is provided for mounting an intake pipe 20 bifurcated at its downstream portion and is mounted to an upstream opening of the intake port 15 by bolts not shown. A flange (not shown) for mounting an exhaust pipe is mounted to a downstream opening of the exhaust port 16**.

Figure 2:
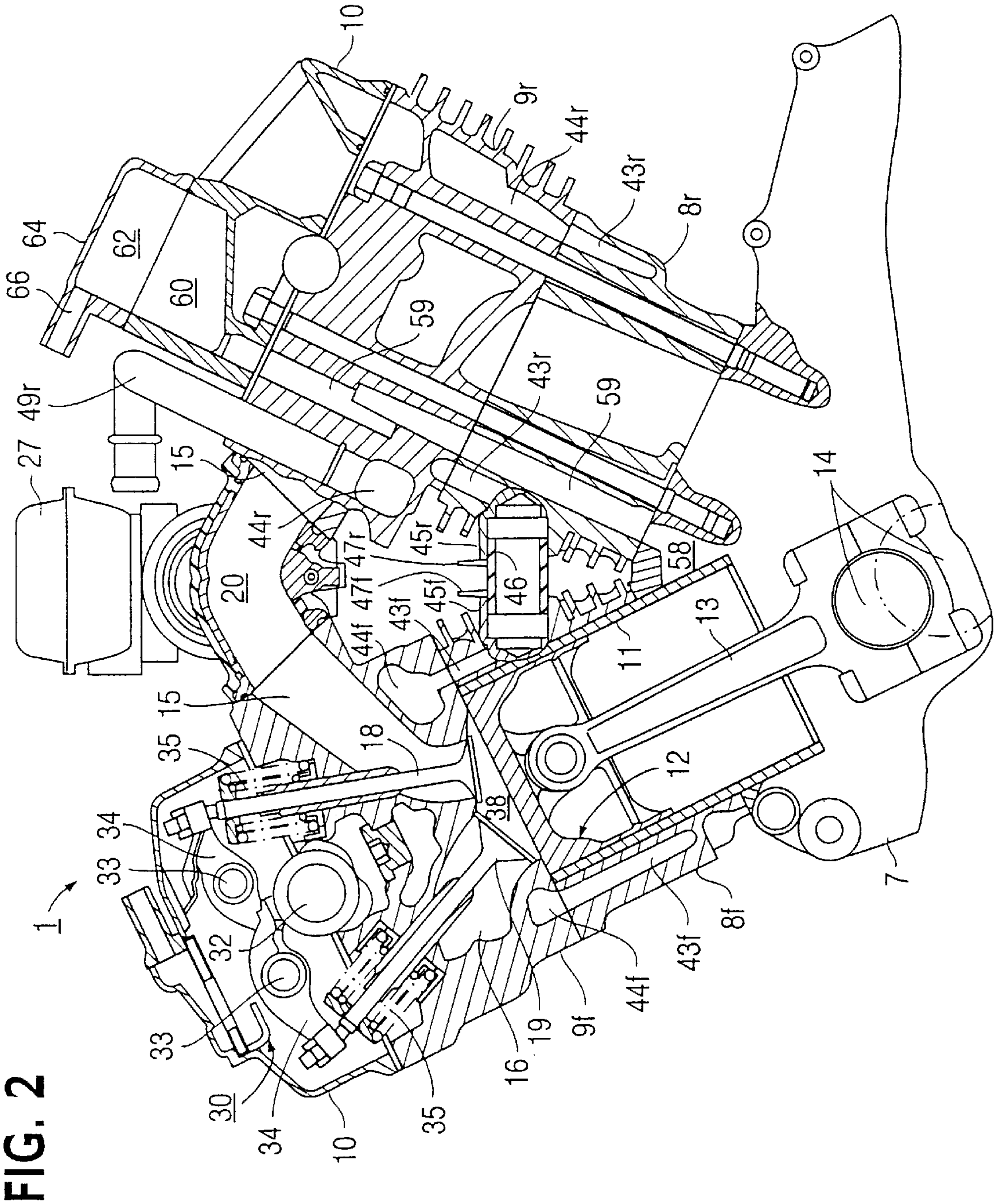
FIG. 2 is a vertical sectional side view of an essential part of the internal combustion engine shown in FIG. 1.
Figure 6:
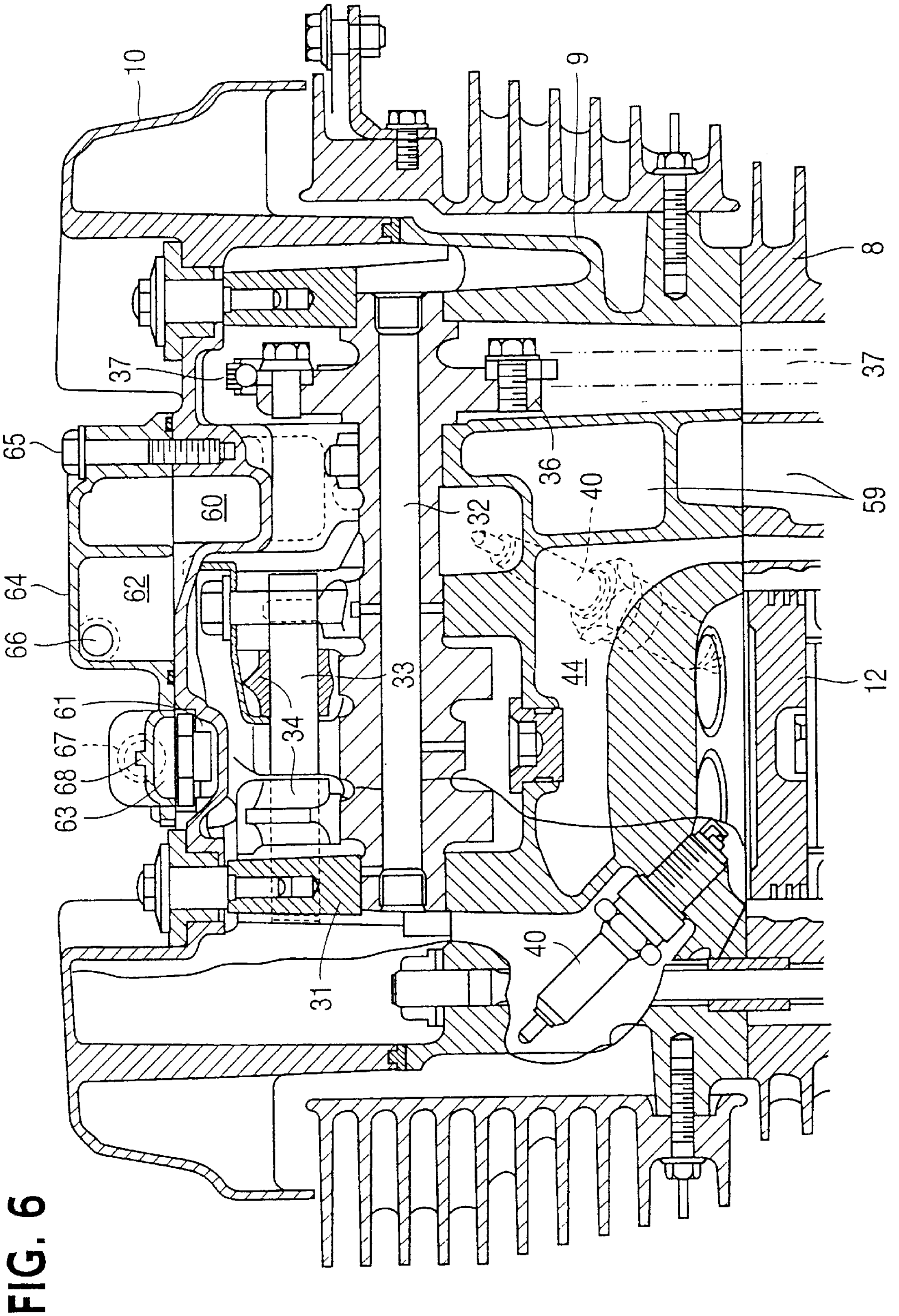
FIG. 6 is a vertical section of FIG. 5.
Figure 7:
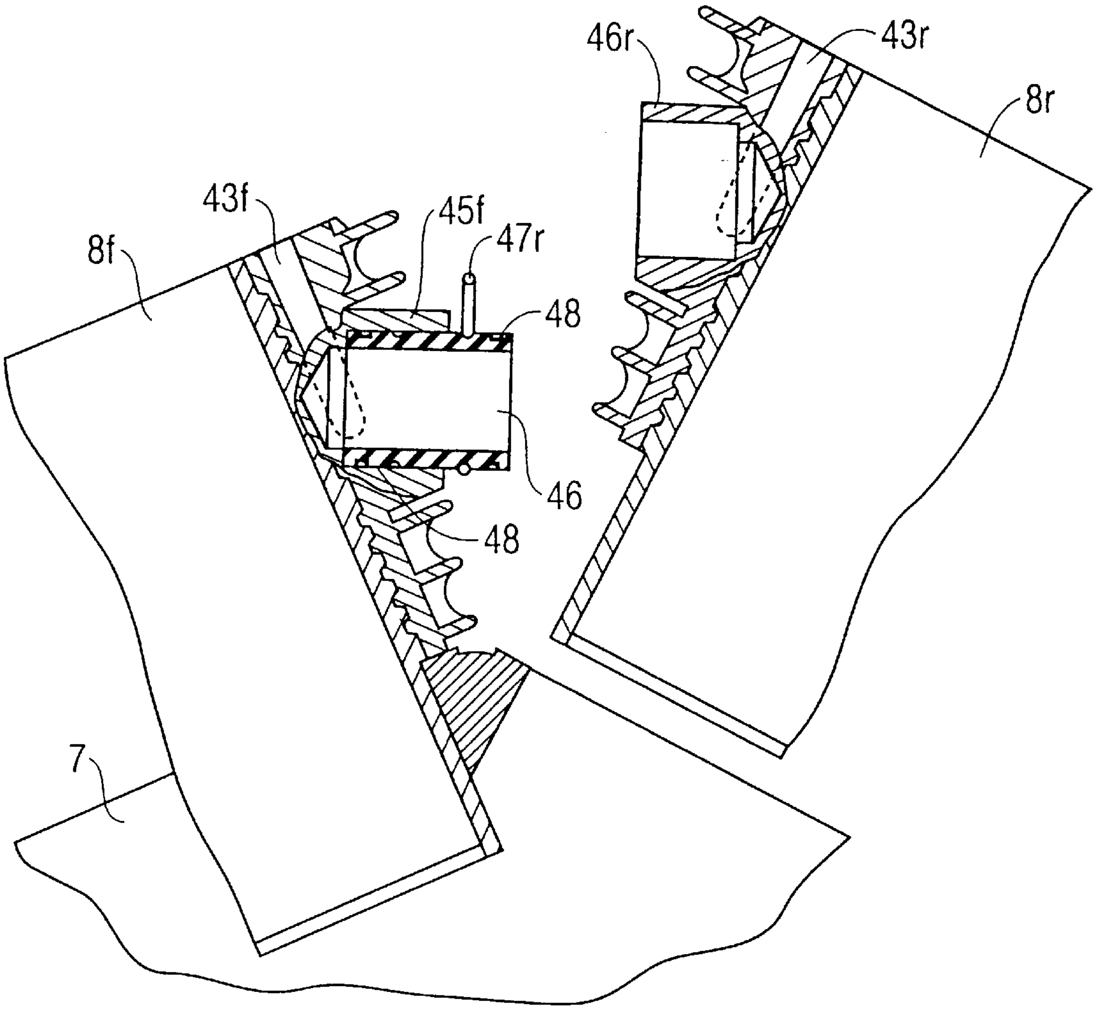
FIG. 7 is a vertical sectional side view of an essential part showing a first step of connecting a connecting pipe in the internal combustion engine shown in FIG. 1.

As shown in FIGS. 2 and 6, an intake valve 18 and an exhaust valve 19 are provided on the cylinder hole 11 side of the intake port 15 and the exhaust port 16, respectively. A valve operating device 30 for operating the intake valve 18 and the exhaust valve 19 includes a camshaft 32 rotatably supported by a camshaft holder 31 in parallel relationship to the crankshaft 14. A rocker arm 34 is pivotably supported to a rocker arm shaft 33 parallel to the camshaft 32. Valve springs 35 are provided for normally biasing the intake valve 18 and the exhaust valve 19 to their closed positions. A driven sprocket 36 is mounted on the camshaft holder 31. An endless chain 37 is wrapped around the driven sprocket 36 and a drive sprocket mounted integrally with the crankshaft 14. The camshaft 32 is rotationally driven at a speed half that of the crankshaft 14, and the intake valve 18 and the exhaust valve 19 are driven at a required timing once every two revolutions of the crankshaft 14.

An ignition plug 40 is provided near each of the two intake valves 18.

Figure 3:
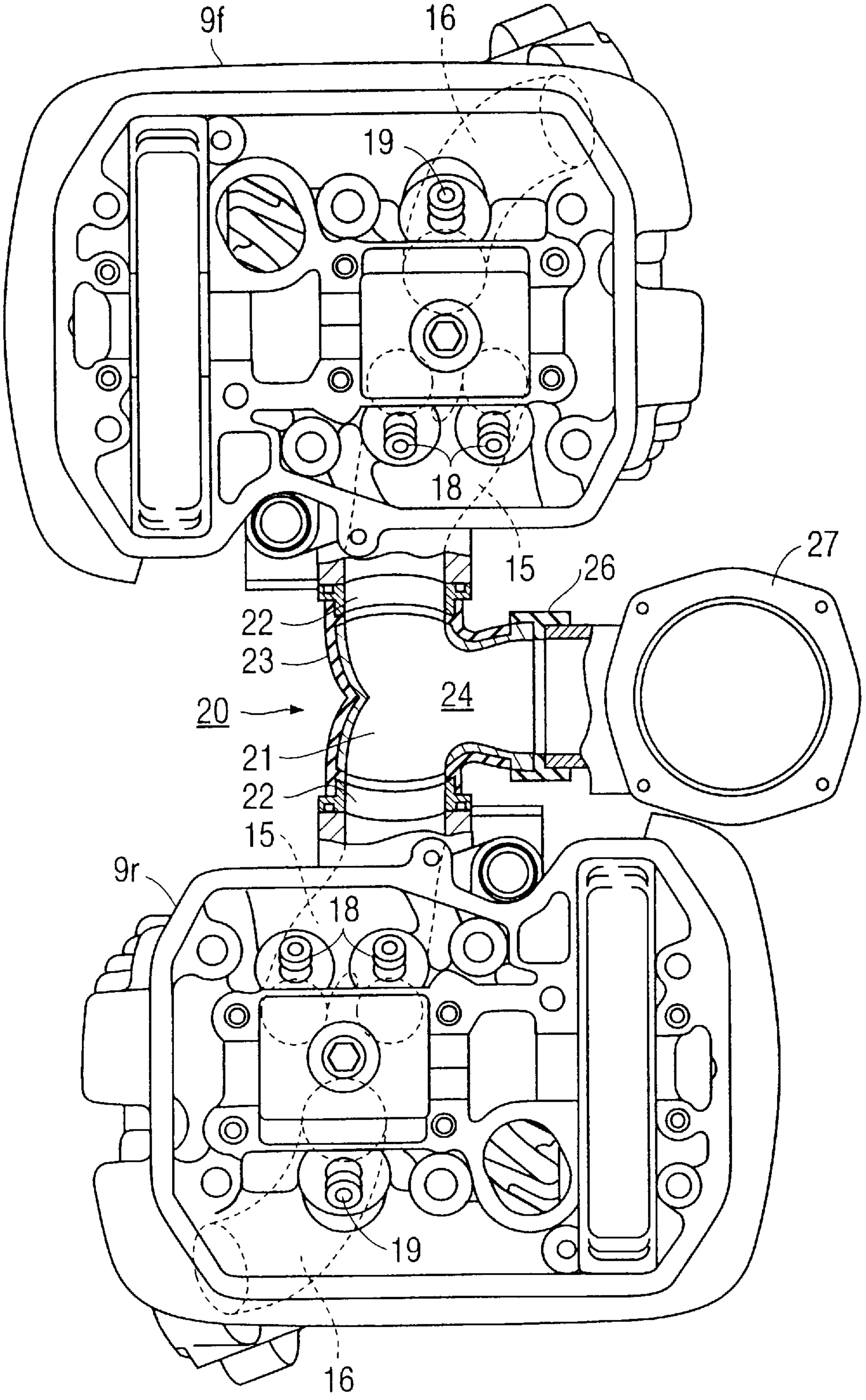
FIG. 3 is a plan view of the internal combustion engine shown in FIG. 1 in the condition where a head cover is removed and an intake pipe is horizontally cut.

As shown in FIG. 3, the intake pipe 20 includes an intake pipe body 21 formed of aluminum and connected to an outlet portion 28 of a carburetor 27, two intake pipe mounting flanges 22 formed of aluminum and abutting against air inlets of the intake ports 15 in the front and rear cylinder heads **9*f* and 9*r* of the internal combustion engine 1, and a cover member 23 formed of rubber for covering the outer circumferential surface of the intake pipe body 21 to hermetically and integrally connect the intake pipe body 21 and the intake pipe mounting flanges 22. The intake pipe body 21 and the two intake pipe mounting flanges 22 are formed as separate members. The intake pipe 20 is manufactured by charging raw rubber into a gap portion of a die in which the body 21 and the flanges 22** are set, and then vulcanizing the raw rubber by heating the rubber under pressure.

The intake pipe body 21 is formed with a cooling water passage 24. A cooling water inlet joint (not shown) is mounted at a lower end opening of the cooling water passage 24, and a cooling water outlet joint 26 is mounted at an end opening of the intake pipe body 21 on the carburetor 27 side. An annular groove is formed over the entire circumference of the opening of an abutting surface of each flange 22 against the cylinder heads **9*f* and 9*r***, and a packing is engaged with each annular groove.

As shown in FIG. 1, a cooling water pump 41 is adapted to be rotationally driven by the crankshaft 14 and is provided at a lower portion of the crankcase 7 on the left side of the vehicle. A cooling water supply pipe 42 is connected to a discharge port of the cooling water pump 41. An upper end of the cooling water supply pipe 42 is connected to a cooling water passage **43*f* of the front cylinder 8*f*** at a front lower portion thereof.

Figure 4:
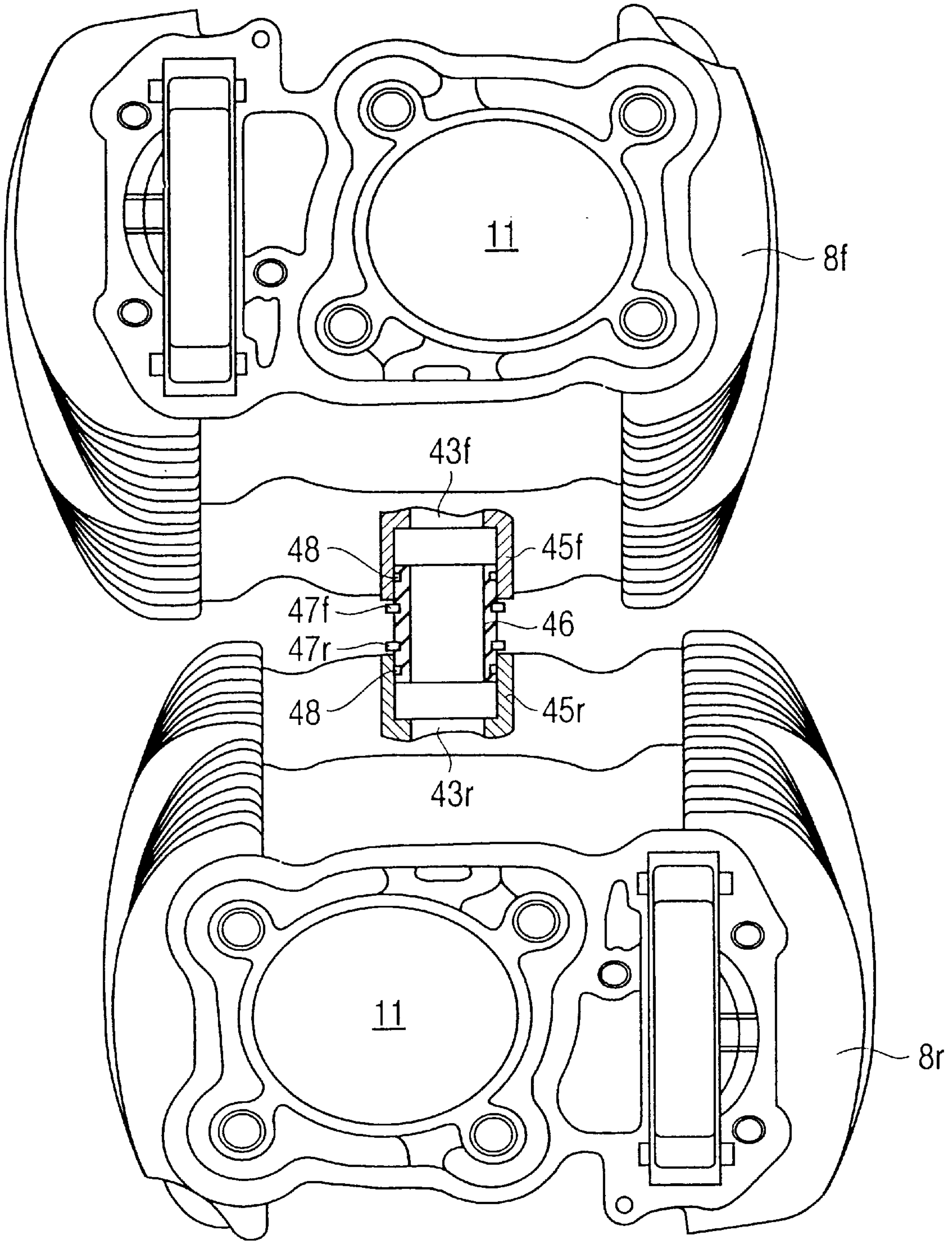
FIG. 4 is a plan view of a cylinder block in the internal combustion engine shown in FIG. 1.
Figure 5:
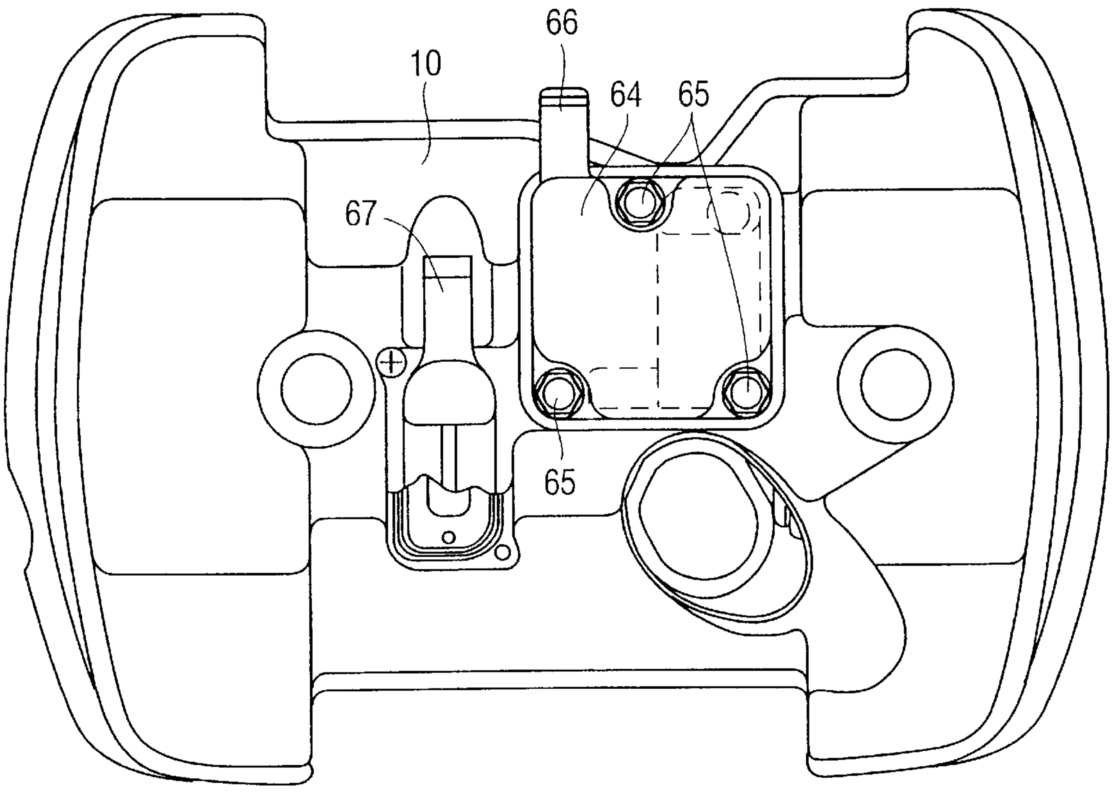
FIG. 5 is a plan view of a cylinder head in the internal combustion engine shown in FIG. 1.

The front cooling water passage **43*f* of the front cylinder 8*f* communicates with a front cooling water passage 44*f* of the front cylinder head 9*f*. The cooling water passage 44 includes the front cooling water passage 44*f* and the rear cooling water passage 44*r*. The rear cooling water passage 43*r* of the rear cylinder 8*r* communicates with a rear cooling water passage 44*r* of the rear cylinder head 9*r*. As shown in FIG. 4, water pipes 45*f* and 45*r* are cylindrical portions projecting from opposed positions of the front and rear cylinders 8*f* and 8*r* so as to extend in one straight line. A connecting pipe 46 is formed of rubber (or aluminum) and is inserted in the water pipes 45*f* and 45*r*. Ring clips 47*f* and 47*r* are engaged with annular grooves formed on the outer circumference of the connecting pipe 46 at the front ends of the water pipes 45*f* and 45*r*. O-rings 48 are engaged with the outer circumference of the connecting pipe 46 near the opposite ends thereof. Thus, the water pipes 45*f* and 45*r*** are connected to each other in a water tight manner.

Figure 8:
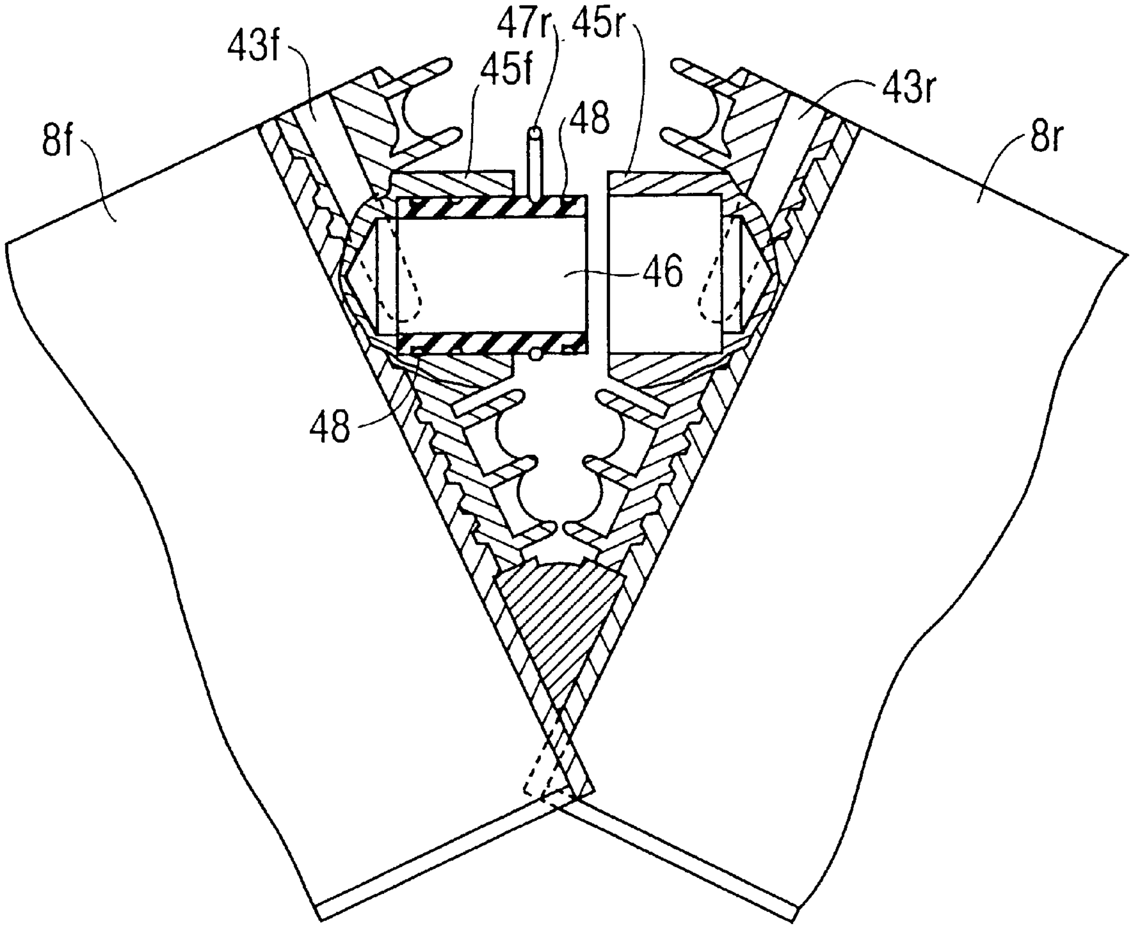
FIG. 8 is a vertical sectional side view similar to FIG. 7, showing the next step.
Figure 9:
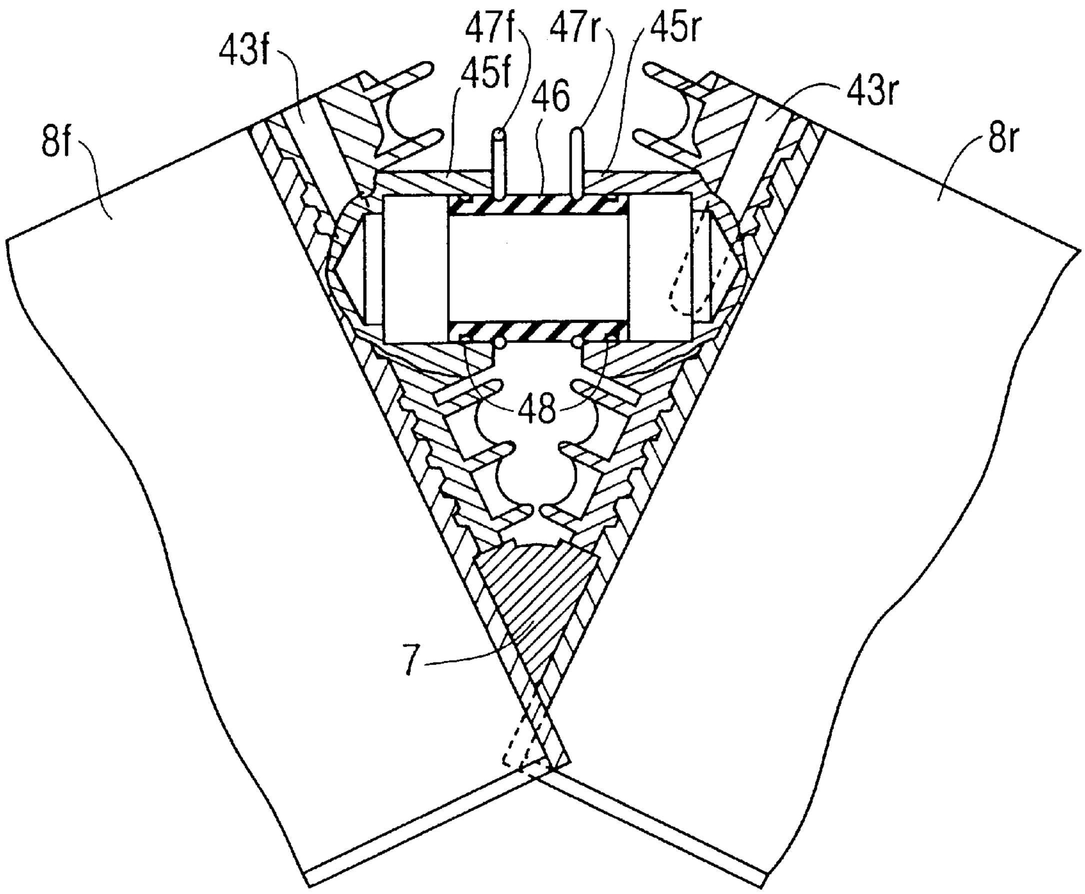
FIG. 9 is a vertical sectional side view similar to FIG. 7, showing a condition where the connection of the connecting pipe is finished.
Figure 10:
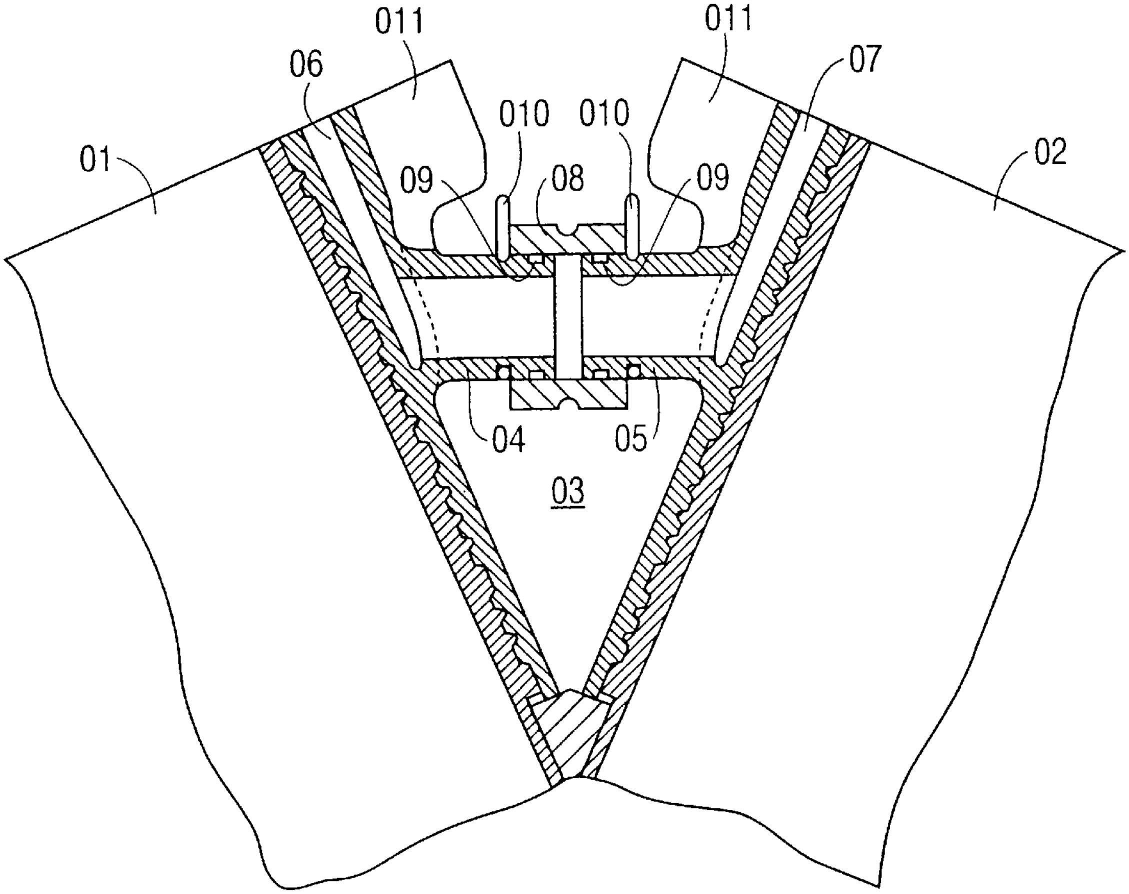
FIG. 10 (PRIOR ART)
FIG. 10 is a vertical sectional side view showing a cooling water passage structure of the prior art.

The connecting pipe 46 is engaged into the front and rear water pipes **45*f* and 45*r* in the following manner. In the condition shown in FIG. 7 where the front cylinder 8*f* is engaged with the crankcase 7, a front end portion of the connecting pipe 46 with the front ring clip 47***f* removed is deeply inserted into the water pipe 45*f* of the front cylinder 8*f*. As shown in FIG. 8, the rear cylinder 8*r* is next engaged with the crankcase 7. As shown in FIG. 9, the connecting pipe 46 is next slid rearwardly to insert a rear end portion of the connecting pipe 46 into the water pipe 45*r* of the rear cylinder 8*r* until the rear ring clip 47*r* comes into abutment against the front end of the rear water pipe 45*r*. Further, the front ring clip 47*f* is next engaged with the front annular groove on the outer circumference of the water pipe 45.

As shown in FIGS. 1 and 2, cooling water pipes 49*f* and 49*r* respectively communicate with the cooling water passages 44*f* and 44*r* and are engaged with the tops of the cylinder heads 9*f* and 9*r*, respectively. The cooling water pipe 49*f* is connected through a rubber hose 51 to a thermostat 50. The cooling water pipe 49*r* is connected through a rubber hose 52 to the thermostat 50. The thermostat 50 is connected through a rubber hose 56 to an upper tank 54 of a radiator 53 provided along the down tube 3. A lower tank 55 of the radiator 53 is connected through a rubber hose 57 to an intake portion of the cooling water pump 41. When the cooling water temperature is not higher than a given temperature, a valve of the thermostat 50 is closed to stop the discharge of the cooling water through the rubber hose 56 to the upper tank 54 of the radiator 53.

As shown in FIGS. 2 and 6, the head cover 10 is formed with a breather lower recess 60 communicating with a crank chamber 58 in the crankcase 7 through a breather passage 59 and with a secondary air lower recess 61 communicating with the exhaust port 16 in the cylinder heads 9*f* and 9*r* through a secondary air passage (not shown). A lid member 64 is formed with a breather upper recess 62 and a secondary air upper recess 63 respectively opposed to the breather lower recess 60 and the secondary air lower recess 61. The lid member 64 is mounted on the head cover 10 by a bolt 65. The breather lower recess 60 and the breather upper recess 62 form a breather chamber. The secondary air lower recess 61 and the secondary air upper recess 63 form a secondary air chamber. Joints 66 and 67 of the breather upper recess 62 and the secondary air upper recess 63 are connected through rubber hoses (not shown) to an air cleaner (not shown, but connected to the upstream side of the carburetor 27). A reed valve 68, which is capable of only passing a secondary air from the secondary air upper recess 63 to the secondary air lower recess 61, is interposed between the secondary air lower recess 61 and the secondary air upper recess 63.

In the operation of the preferred embodiment shown in FIGS. 1 to 9, when the internal combustion engine 1 is in operation, intake air is filtered by the air cleaner not shown, and fuel is supplied by the carburetor 27, in which the intake air and the fuel are mixed at a required air-fuel ratio. The air-fuel mixture is passed in the intake pipe 20 to reach the intake ports 15 in the cylinder heads 9*f* and 9*r*. When the intake valves 18 are opened in a suction stroke, the air-fuel mixture is sucked into a combustion chamber 38 at an upper portion of the cylinder hole 11.

After a compression stroke, the air-fuel mixture in the combustion chamber 38 is ignited by the ignition plugs 40 at a timing near the end of the compression stroke. In an exhaust stroke after an expansion stroke, the exhaust valve 19 is opened to emit a combustion gas through an exhaust pipe and a muffler (both not shown).

Even when a throttle valve (not shown) is operated in a closed direction in the operating condition to increase a suction vacuum, the cover member 23 is strongly pressed on the intake pipe body 21 and the intake pipe mounting flange 22 by a pressure difference between an atmospheric pressure and the suction vacuum. This effect is due to the fact that the cover member 23 covers the outer circumferences of the body 21 and each flange 22 and the outer circumference of the joint portion therebetween. Further, since the cover member 23 is present at the outer circumference of the joint portion between the body 21 and each flange 22, the intake pipe 20 is securely hermetically maintained to thereby prevent entry of the atmospheric air into the intake pipe 20.

A large part of the intake pipe 20 is composed of the rigid body 21 and the rigid flanges 22 both formed of aluminum. Accordingly, even when the pressure difference between the atmospheric pressure and the suction vacuum acts on the intake pipe 20, the shape of the intake passage in the intake pipe 20 does not change. The original shape can be maintained. As a result, the air-fuel mixture is not disturbed, and can be supplied uniformly to the front and rear combustion chambers 38*f* and 38*r*, so that uniform operational conditions can be obtained in the front and rear cylinders 8*f* and 8*r*.

The front and rear cylinders 8*f* and 8*r* are separately mounted on the crankcase 7. Accordingly, even when the cylinders 8*f* and 8*r* vibrate independently of each other to cause a change in distance between the openings of the intake ports 15*f* and 15*r* of the cylinders 8*f* and 8*r*, the change in distance is absorbed by the cover member 23 of the intake pipe 20, and the vibrations of the cylinders 8*f* and 8*r* are suppressed.

The flanges 22 are interposed between the cylinder heads 9*f* and 9*r* and the body 21 is integrally mounted to the carburetor 27. Accordingly, the vibrations of the cylinders 8*f* and 8*r* of the internal combustion engine 1 are absorbed by the flanges 22 to thereby suppress transmission of the vibrations of the cylinders 8*f* and 8*r* to the carburetor 27, so that the carburetor 27 can properly operate without adverse effects due to vibrations. Thus, the durability of the carburetor 27 can be improved.

When the cooling water temperature rises to open the valve in the thermostat 50, the cooling water discharged from the cooling water pump 41 is supplied through the cooling water supply pipe 42 to the cooling water passage 43*f* in the front cylinder 8*f*. A part of the cooling water flowing in the front cooling water passage 43*f* is passed through the front cooling water passage 44*f* in the front cylinder head 9*f*, the front cooling water pipe 49*f*, and the rubber hose 51 to reach the thermostat 50. On the other hand, a remaining part of the cooling water flowing in the front cooling water passage 43*f* is passed through the front water pipe 45*f*, the connecting pipe 46, and the rear water pipe 45*r* to flow into the cooling water passage 43*r* in the rear cylinder 8*r*. Then, the cooling water in the cooling water passage 43*r* is passed through the cooling water passage 44*r* in the rear cylinder head 9*r*, the rear cooling water pipe 49*r*, and the rubber hose 52 to reach the thermostat 50. The cooling water from the rubber hose 51 and the cooling water from the rubber hose 52 are joined in the thermostat 50, and then flow through the rubber hose 56 into the upper tank 54 of the radiator 53. Then, the cooling water flows down from the upper tank 54 through a tube (not shown) to the lower tank 55. During the flow of the cooling water, it is cooled by a cooling air. The cooling water is finally returned from the lower tank 55 through the rubber hose 57 to the inlet port of the cooling water pump 41.

The connecting pipe 46 is formed of rubber having a high elasticity. The outer circumferential surface of the connecting pipe 46 is in close contact with the inner circumferential surface of the water pipe 45*f* of the front cylinder 8*f* and the inner circumferential surface of the water pipe 45*r* of the rear cylinder 8*r*. Accordingly, even when the pressure of the cooling water in a cooling water system increases, the outer circumferential surface of the connecting pipe 46 is pressed on the inner circumferential surfaces of the water pipes 45*f* and 45*r*, thereby preventing leakage of the cooling water.

Even if there are mounting errors of the front cylinder 8*f* and the rear cylinder 8*r* with respect to the crankcase 7 and working errors of the water pipes 45*f* and 45*r*, for example, these errors can be absorbed by the connecting pipe 46 and it can be mounted easily and properly, because the connecting pipe 46 is elastically deformable.

The connecting pipe 46 is inserted into the water pipes 45*f* and 45*r*, and the inner circumferential surfaces of the water pipes 45*f* and 45*r* are worked. Accordingly, even if the projection lengths of the water pipes 45*f* and 45*r* from the front and rear cylinders 8*f* and 8*r* are short, the depths of the inner circumferential surfaces of the water pipes 45*f* and 45*r* can be made large without limitation with regard to the projection lengths. Therefore, the insertion length of the connecting pipe 46 can be sufficiently ensured regardless of the cylinder scissors angle of about 52° thereby ensuring water tightness.

The inner circumferential surfaces of the water pipes 45*f* and 45*r* are worked by cutting. Accordingly, in performing the cutting by rotating the front and rear cylinders 8*f* and 8*r* about the centers of the water pipes 45*f* and 45*r*, a cutting tool can be inserted into the water pipes 45*f* and 45*r* regardless of the rotation of the cylinders 8*f* and 8*r* to thereby facilitate required cutting, even though the lower end portions of the cylinders 8*f* and 8*r* project more than the water pipes 45*f* and 45*r*.

A blow-by gas in the crank chamber 58 of the crankcase 7 flows through the breather passage 59 into the breather chamber defined by the breather lower recess 60 and the breather upper recess 62, and is introduced through the joint 66 and a rubber hose (not shown) to the air cleaner.

The air in the air cleaner flows through a rubber hose (not shown) and the joint 67 to the secondary air upper recess 63, and is introduced through the reed valve 68 to the secondary air lower recess 61. Then, the air in the secondary air lower recess 61 is supplied as a secondary air through a secondary air passage (not shown) to the exhaust port 16.

The breather lower recess 60 and the secondary air lower recess 61 are formed in the head cover 10. The breather upper recess 62 and the secondary air upper recess 63 are formed in the lid member 64. The breather chamber and the secondary air chamber are defined only by integrally connecting the lid member 64 to the head cover 10 by means of the bolt 65. Accordingly, the number of parts and the number of assembly man-hours can be reduced to thereby allow cost reduction.

In the preferred embodiment shown in FIGS. 1 to 9, the breather upper recess 62 and the secondary upper recess 63 are formed in the single lid member 64. In modification, the lid member 64 may be separated into two lid members, and the breather upper recess 62 and the secondary air upper recess 63 may be formed in the two lid members.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cooling water passage structure in a water cooled type V-shaped internal combustion engine comprising:

a first connector having a first end in communication with a cooling water passage in a first cylinder, said first connector having a distal end projecting from said first cylinder and an inner surface;

a second connector having a first end in communication with a cooling water passage in a second cylinder, said second connector having a distal end projecting from said second cylinder and an inner surface;

said first connector and said second connector projecting substantially in one straight line into a V-shaped space defined between said opposed cylinders; and a connecting member for connecting the distal end of said first connector to the distal end of said second connector, said connecting member being formed as a continuous member and forming a water-tight engagement between said first cylinder and said second cylinder, said connecting member includes a continuous outer surface adapted to be mounted within a long inner surface wherein said connecting member is slideable within said first connector and said second connector for forming said water-tight engagement between said first cylinder and said second cylinder.

2. The cooling water passage structure in a water cooled type V-shaped internal combustion engine according to claim 1, wherein said connecting member is relatively flexible.

3. The cooling water passage structure in a water cooled type V-shaped internal combustion engine according to claim 2, wherein said connecting member includes a first stop member abutting against said distal end of said first connector and said connecting member includes a second stop member abutting against said distal end of said second connector said outer surface of said connecting member being adapted to be mounted within the inner surface of said first connector and said second connector for forming said water-tight engagement between said first cylinder and said second cylinder.

4. The cooling water passage structure in a water cooled type V-shaped internal combustion engine according to claim 2, wherein O-rings are interposed between said inner surface of said first connector and said inner surface of said second connector and said outer surface of opposite end portions of said connecting member.

5. The cooling water passage structure in a water cooled type V-shaped internal combustion engine according to claim 1, wherein said connecting member includes a first stop member abutting against said distal end of said first connector and said connecting member includes a second stop member abutting against said distal end of said second connector said outer surface of said connecting member being adapted to be mounted within the inner surface of said first connector and said second connector for forming said water-tight engagement between said first cylinder and said second cylinder.

6. The cooling water passage structure in a water cooled type V-shaped internal combustion engine according to claim 5, wherein O-rings are interposed between said inner surface of said first connector and said inner surface of said second connector and said outer surface of opposite end portions of said connecting member.

7. The cooling water passage structure in a water cooled type V-shaped internal combustion engine according to claim 1, wherein O-rings are interposed between said inner surface of said first connector and said inner surface of said second connector and said outer surface of opposite end portions of said connecting member.

8. A cooling fluid passage for a fluid cooled type V-shaped internal combustion engine comprising:

a first cylinder including a first piston and first connecting rod operatively connected to a crankshaft;

a second cylinder including a second piston and second connecting rod operatively connected to the crankshaft;

said first and second cylinders being positioned at an angle relative to each other;

a first fluid cooling passage being in communication for supplying cooling fluid to said first cylinder;

a second fluid cooling passage being in communication for supplying cooling fluid to said second cylinder; and a connecting member including opposite end portions being in a fluid-tight engagement with said first fluid cooling passage in said first cylinder and said second fluid cooling passage in said second cylinder, said connecting member being formed as a continuous member and includes a continuous outer surface adapted to be mounted within a long inner surface wherein said connecting member is slideable within said first fluid cooling passage and said second fluid cooling passage for forming said fluid-tight engagement therebetween.

9. The cooling fluid passage for a fluid cooled type V-shaped internal combustion engine according to claim 8, wherein said connecting member is relatively flexible.

10. The cooling fluid passage for a fluid cooled type V-shaped internal combustion engine according to claim 9, wherein said connecting member includes a first stop member abutting against an end surface of said first cooling passage and said connecting member includes a second stop member abutting against and end surface of said second cooling passage, said first and second stop members being in engagement with said outer surface of said connecting member wherein said connecting member is mounted within the inner surface of said first connector and said second connector for forming said fluid-tight engagement therebetween.

11. The cooling fluid passage for a fluid cooled type V-shaped internal combustion engine according to claim 9, wherein O-rings are interposed between said inner surface of said first fluid cooling passage and said inner surface of said second fluid cooling passage and said outer surface of opposite end portions of said connecting member.

12. The cooling fluid passage for a fluid cooled type V-shaped internal combustion engine according to claim 8, wherein said connecting member includes a first stop member abutting against an end surface of said first cooling passage and said connecting member includes a second stop member abutting against and end surface of said second cooling passage, said first and second stop members being in engagement with said outer surface of said connecting member wherein said connecting member is mounted within the inner surface of said first connector and said second connector for forming said fluid-tight engagement therebetween.

13. The cooling fluid passage for a fluid cooled type V-shaped internal combustion engine according to claim 12, wherein O-rings are interposed between said inner surface of said first fluid cooling passage and said inner surface of said second fluid cooling passage and said outer surface of opposite end portions of said connecting member.

14. The cooling fluid passage for a fluid cooled type V-shaped internal combustion engine according to claim 8, wherein O-rings are interposed between said inner surface of said first fluid cooling passage and said inner surface of said second fluid cooling passage and said outer surface of opposite end portions of said connecting member.

* * * * *